T. L. BURTON.
BRAKE HEAD AND SHOE BALANCING DEVICE.
APPLICATION FILED JULY 27, 1916.
1,269,257.
Patented June 11, 1918.
2 SHEETS—SHEET 1.
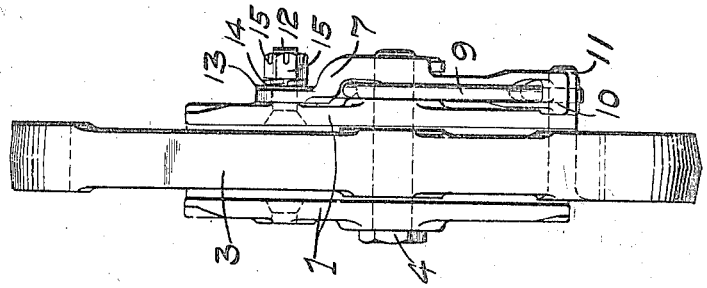
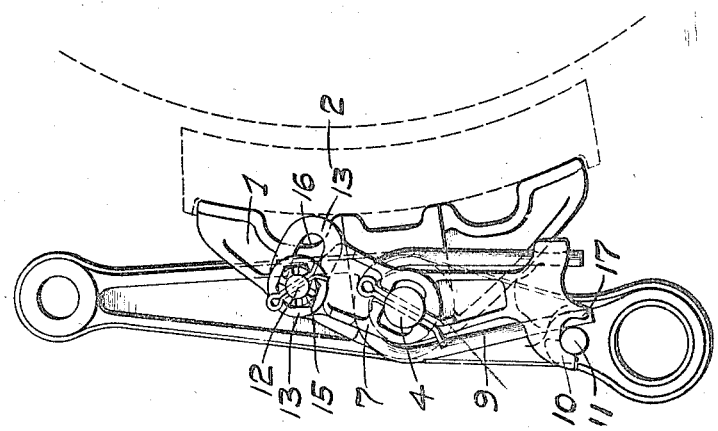
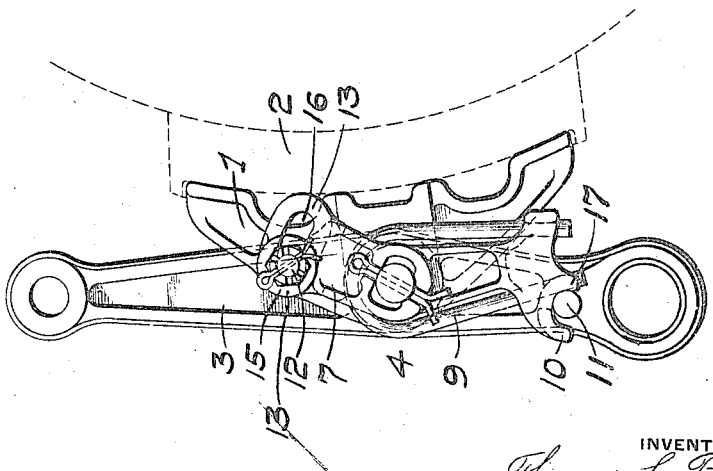
INVENTOR.
Thomas L. Burton
by Edward A. Wright.
Atty.

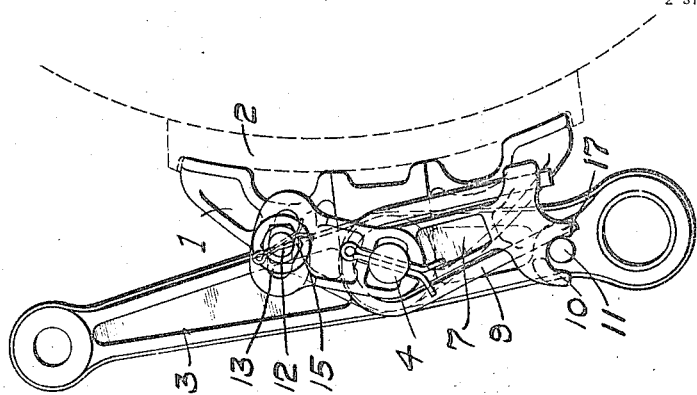
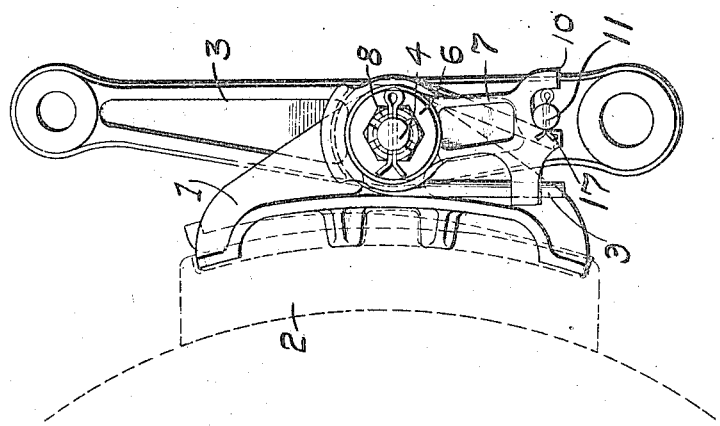
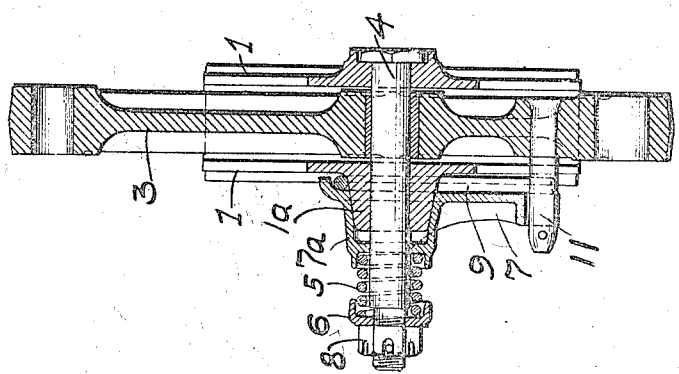

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE HEAD AND SHOE BALANCING DEVICE.

1,269,257.

Specification of Letters Patent. Patented June 11, 1918.

Application filed July 27, 1916. Serial No. 111,582.

*To all whom it may concern:*

Be it known that I, THOMAS L. BURTON, a citizen of the United States, residing at St. Louis, in the State of Missouri, have invented certain new and useful Improvement in Brake Head and Shoe Balancing Devices, of which improvement the following is a specification.

This invention relates to brake heads and hangers, and has for its object, to provide improved connecting means, whereby the brake head will be automatically adjusted upon its pivot, so that the shoe may be maintained in a position substantially concentric with the wheel, both when applied and when released, and during the various stages of wear of the shoe and wheel.

In my prior Patent No. 1,199,872, issued Oct. 3, 1916, there is shown and described, a form of connection between brake head and hanger for accomplishing this purpose, and comprising a friction arm mounted on the pivot of the brake head and having frictional engagement with the hanger, and a spring acting between the friction arm and brake head to provide for a limited movement of the brake head relative to the hanger during the application and release movement without moving the friction arm.

According to my present improvement, the friction arm has frictional engagement with the brake head, and the spring is located to act between the arm and the hanger, so that the friction arm moves with the brake head relative to the hanger during the pivotal movement of the brake head as the hanger swings forward and backward in applying and releasing the shoe from the wheel.

In the accompanying drawings: Figure 1 is a side elevation of a brake head and hanger connection embodying my improvement, the parts being indicated in applied position; Fig. 2, a similar view showing the parts in release position; Fig. 3, an end view; Fig. 4, a side elevation showing the parts in applied position when the shoe and wheel are partly worn; Fig. 5, a transverse vertical section taken through the pivot, and showing a modification; and Fig. 6, a side elevation of the same.

Referring to Figs. 1 to 4, the brake head, 1, carrying the shoe, 2, is pivotally mounted on the bolt, 4, passing through the two flanges of the brake head. The friction arm, 7, is pivotally mounted on the bolt, 4, and is provided with an extension having a slot, 16, and a frictional surface for engaging the brake head. A stud or pin, 12, is mounted in one flange of the brake head, and extends through the slot, 16, being provided with a nut, 15, a spring washer, 14, and a friction washer, 13, for clamping the parts together to exert the desired amount of frictional resistance to relative movement between the arm and the brake head. The brake head and arm are adapted to have a limited movement on the pivot bolt relative to the hanger, and for defining this movement, the arm may be provided with two stop lugs, 10 and 17, spaced the desired distance apart, and adapted to engage the stud or pin, 11, fixed on the hanger. A spring, 9, acts between the arm and the hanger, and tends to keep the stud, 11, in engagement with the lug, 10, when the brake shoe is released, and thus maintain the same substantially concentric with the wheel, as indicated in Fig. 2. The spring is preferably of U shape, extending around the pivot bolt, and having one end bearing against the stud, 11, and the other end engaging a lug on the friction arm.

During the swinging movement of the brake hanger from the release position, as shown in Fig. 2, to the application position, as shown in Fig. 1, the lower end of the shoe, of course, moves faster than the upper end, and, consequently, first comes into contact with the wheel. The spring, 9, then yields and allows the limited movement of the brake head upon its pivot relative to the hanger, and until the stud, 11, comes into contact with the stop lug, 17, as indicated in Fig. 1. During this limited movement, the frictional engagement between the arm, 7, and brake head, as produced by the clamping nut, 15, is sufficient to prevent any relative movement between these parts, and the arm therefore turns with the brake head relative to the hanger. In this applied position, the brake shoe is still substantially concentric with the wheel.

As the shoe and wheel become worn, the hanger must necessarily swing through a longer arc, in order to bring the shoe against the wheel, and the stud, 11, will, in that case, come into contact with stop lug, 17, before the shoe reaches its full engagement with the wheel. The further swinging movement of the hanger, acting against the lug, 17, then overcomes the frictional resistance between the brake head and friction arm, and the pin, 12, is moved along the slot a sufficient distance to allow a full bearing of the shoe upon the wheel, as indicated in Fig. 4. The wear of the shoe is thus compensated for by the movement between the friction members, and the position of the shoe is maintained substantially concentric with the wheel at all times. When a shoe is worn out and a new one is inserted, the friction nut may be loosened, and the pin adjusted back to the other end of the slot.

In the modification shown in Figs. 5 and 6, the construction is similar to that above described, except that a different means is employed for establishing the frictional resistance between the arm and the brake head. According to this modification the friction is produced with the same bolt that is used for pivoting the head upon the hanger. The friction arm, 7, is provided with a hollow hub portion, 7ª, having an interior frictional surface engaging a corresponding tapered friction surface on hub portion, 1ª, of the brake head, the friction being produced by the spring, 5, spring washer or cap, 6, and nut, 8, mounted on the bolt, 4. The nut is adjusted to give the desired frictional resistance to relative movement between the friction arm and the brake head, and the operation is then substantially the same as before described in connection with the form of the invention shown in Figs. 1 to 4.

If it should be desired to make the adjustment between the friction members manually as the brake shoe wears, the clamping nut may be set up sufficiently tight to prevent movement between these parts, and manual adjustment may then be made from time to time, as required. The friction springs may also be dispensed with, if desired.

Having now described my invention, what I claim as new and desire to secure by Letters Patent is:

1. The combination of a brake hanger, a brake head pivotally connected thereto, an arm mounted to turn with the brake head through a limited movement relative to the hanger, and an adjustable connection between said arm and the brake head.

2. The combination of a brake hanger, a brake head pivotally connected thereto, an arm mounted to turn with the brake head through a limited movement relative to the hanger, a spring acting between the hanger and said arm, and an adjustable connection between said arm and the brake head.

3. The combination of a brake hanger, a brake head pivotally connected thereto, a friction arm pivotally mounted to turn with the brake head through a limited movement relative to the hanger, a spring acting between said friction arm and the hanger, and a frictional connection between said friction arm and the brake head.

4. The combination of a brake hanger, a brake head pivotally connected thereto, a friction arm pivotally mounted to have a limited movement relative to the hanger, a frictional connection between said arm and the brake head, and means for adjusting the frictional resistance.

5. The combination of a brake hanger, a brake head pivotally connected thereto, a friction arm pivotally mounted to have a limited movement relative to the hanger, a spring acting between the arm and the hanger, a frictional connection between said arm and the brake head, and a clamping nut for adjusting the frictional resistance.

6. The combination of a brake hanger, a brake head pivotally connected thereto, a friction arm mounted on the same pivot with the brake head, limiting stops for defining the relative movement between the friction arm and the hanger, a spring opposing the movement between said stops, and a frictional connection between said arm and the brake head.

7. The combination of a brake hanger, a brake head pivotally connected thereto, a friction arm mounted on the same pivot with the brake head, a stud carried by the brake head, and a clamping nut mounted on said stud for producing frictional engagement between said arm and the brake head.

In testimony whereof I have hereunto set my hand.

THOMAS L. BURTON.